May 31, 1955 E. F. YENDALL ET AL 2,709,348
PROCESS OF AND APPARATUS FOR SEPARATING GAS MIXTURES
Filed May 20, 1949
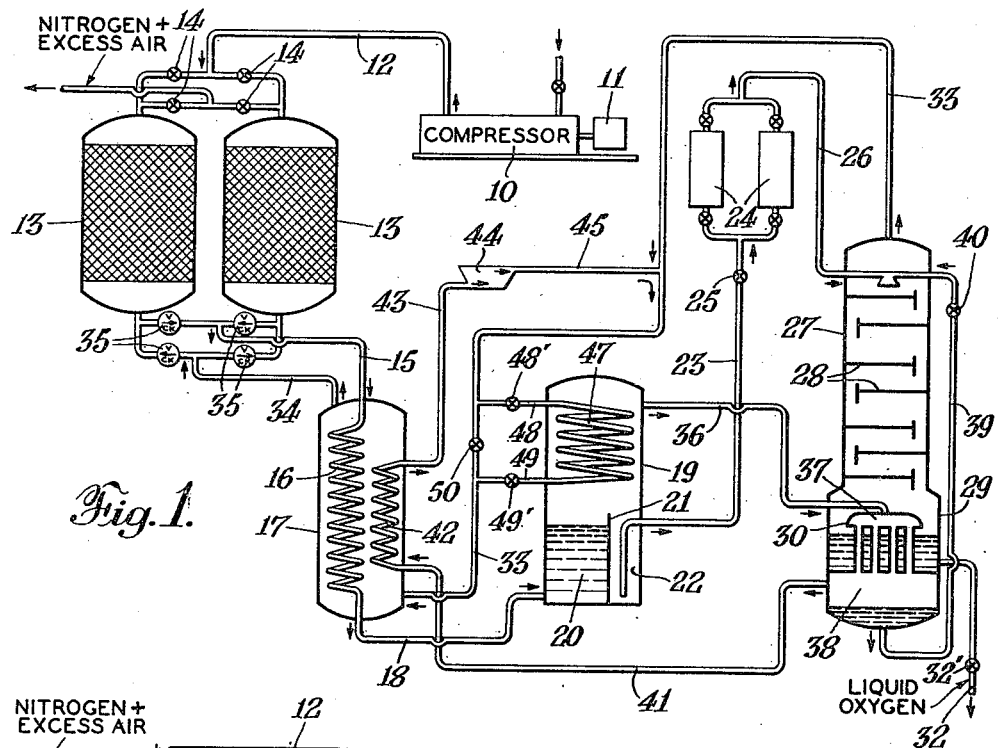
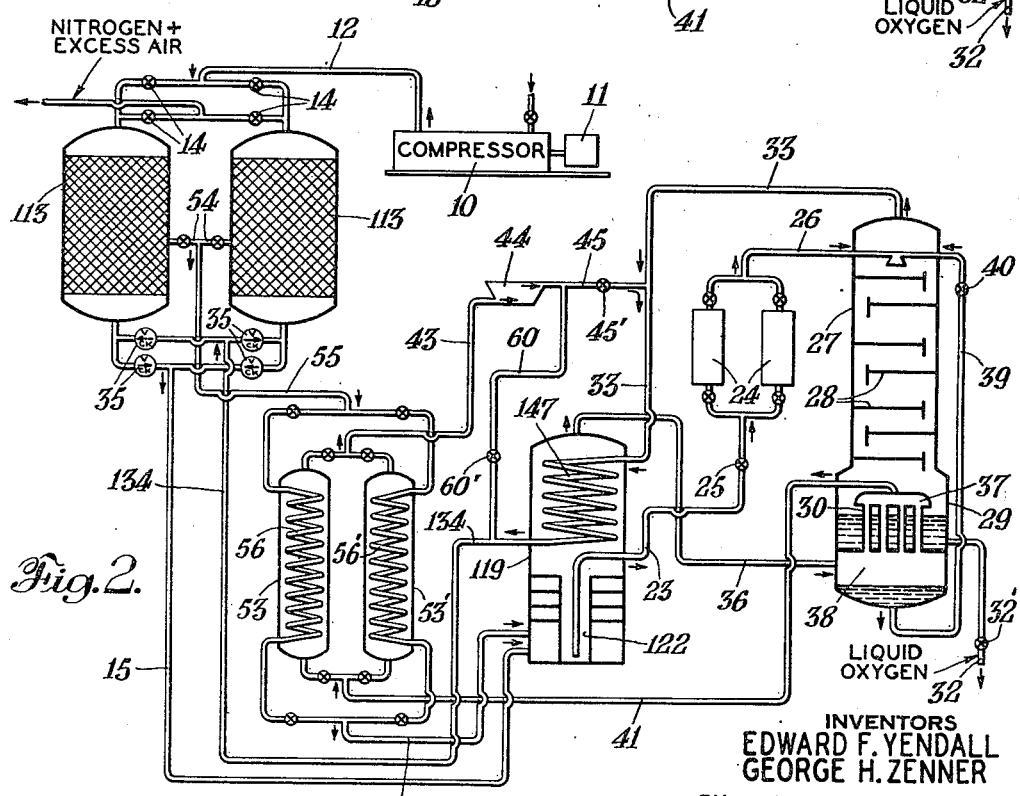
INVENTORS
EDWARD F. YENDALL
GEORGE H. ZENNER
BY *D.C. Harrison*
ATTORNEY

United States Patent Office 2,709,348
Patented May 31, 1955

2,709,348

PROCESS OF AND APPARATUS FOR SEPARATING GAS MIXTURES

Edward F. Yendall and George H. Zenner, Kenmore, N. Y., assignors, by mesne assignments, to Union Carbide and Carbon Corporation, a corporation of New York Application May 20, 1949, Serial No. 94,274

6 Claims. (Cl. 62—123)

This invention relates to a process of and apparatus for separating gas mixtures containing higher-boiling impurities, and more particularly to an improved process and apparatus for separating air to recover a liquid oxygen product with the employment of low-pressure, compact, and lightweight equipment. The subject matter of this patent may be used by or for the Government of the United States for governmental purposes without the payment of any royalties.

The present invention is in part an improvement of that described and claimed in our copending application Serial No. 567,950, filed December 13, 1944, issued August 15, 1950, as Patent No. 2,518,652. As disclosed in said earlier application, lightweight rotary compressor equipment can be used because the cycle employed permits all the air processed to be compressed to a pressure less than 100 p. s. i. Special moisture-removal apparatus is avoided by employing alternately reversed regenerators for the initial heat exchange in which moisture is deposited on heat exchange surfaces and then re-evaporated and carried out with outgoing lower-pressure product. Special chemical or refrigerating apparatus for carbon dioxide removal is avoided by scrubbing the air with liquid air to retain the carbon dioxide and higher-boiling impurities in the liquid air and using only scrubbed air in the rectification. The high refrigeration requirement needed for liquid oxygen production, which is about ten times that required for gaseous oxygen production, is obtained by turbine expansion of a larger amount of air than is rectified.

Objects of the present invention are to provide an improved process and apparatus for separating gas mixtures such as air having the above-mentioned general advantages and which has the further advantages of: being particularly suitable for a portable type plant; avoiding the expansion of carbon dioxide containing air in an expansion turbine; avoiding difficulty caused by clogging of heat exchangers with carbon dioxide; providing a feed to the rectification so enriched in oxygen that a single-stage rectifying column can be used for maximum oxygen production for a given power consumption; by which advantage can be taken of oxygen contained in the excess air processed in the system for production of refrigeration; by which the air to be expanded for producing refrigeration may be warmed to the temperature for most efficient refrigeration production in a way that avoids contamination with impurities; which is easy to control; and which can be restarted after a period of shut-down in a reasonably short time.

These and other objects and advantages of this invention will become apparent from the following description and the accompanying drawings, in which the figures are diagrammatic views showing exemplary embodiments of apparatus for carrying out the process of the invention, particularly for the separation of air to produce a liquid oxygen product, and wherein:

Fig. 1 is a diagrammatic view of an exemplary apparatus according to the invention; and Fig. 2 is a similar view of another exemplary assemblage of apparatus according to the invention.

Referring now to the drawing, and particularly to Fig. 1, atmospheric air is preferably compressed to a pressure between about 60 to 100 p. s. i. in a suitable compressor such as a multi-stage rotary compressor 10 driven by a prime mover 11 that may be a turbine. The compressed air is conducted by a conduit 12 to the warm ends of a set of regenerators 13 having cross-connections at the warm ends provided with reversing valves 14. The regenerators or cold accumulators may be similar, for example, to those proposed by M. Frankl in United States Patent No. 1,970,299. In Fig. 1, however, the regenerators 13 are designed for cooling the air passed therethrough to a temperature of about −100° C. The air so cooled and freed of moisture leaves the cold ends of the regenerators through a conduit 15 connecting to one end of a heat exchange passage or coil 16 within a heat exchanger 17 wherein it is cooled to condensation temperature. From coil 16, a conduit 18 conducts the cold air to the lower part of a scrubber chamber 19 wherein the air is thoroughly contacted with a liquid fraction of the air to scrub it free of particles of carbon dioxide and higher-boiling point impurities, such impurities being concentrated in the scrubber liquid 20, which overflows a partition 21 to a space 22 from which the impurity-bearing used liquid is drawn by a conduit 23 to a means for separating impurities represented as a set of filters 24. The conduit 23 may have therein an expansion valve 25 and the cleaned liquid from the filters 24 is conducted by a conduit 26 to the upper end of a rectifying column 27.

The rectifying column contains gas and liquid contact means such as perforated plates 28, and has at its lower end a chamber 29 enclosing a condenser 30. In the rectifying column, the descending liquid is subject to heat exchange and purity changes on the plates 28 with the ascending vapors, and a liquid oxygen product of the desired purity collects in the chamber 29. Such liquid oxygen product is withdrawn through a conduit 32 controlled by valve 32', the rate of withdrawal being regulated by the valve 32' to maintain the proper liquid level in the chamber 29. The effluent vapor from the column, which is richer in nitrogen than air, leaves through a conduit 33 which conducts it to the cold end of the heat exchanger 17, and from the warm end of the heat exchanger 17 a conduit 34 conducts outgoing gas material to the cold end of the regenerators 13, the cross-connections at the cold end of the regenerators being provided with suitable check valves 35 which automatically direct the flow to the proper respective regenerator.

The scrubbed air portion which has not been liquefied leaves the upper part of the scrubber 19 through a conduit 36 which conducts it to the upper header 37 of the condenser 30. The condenser 30 connects with a lower header chamber 38 wherein the fraction of air, which is liquefied by the condenser 30 by a heat exchanger producing vaporization of some of the oxygen product, may be collected. Such liquid, which has a high oxygen content, is transferred by a conduit 39 to the upper end of the rectifying column 27, the conduit 39 being provided with a transfer valve 40. The excess air which is not condensed during its passage through the condenser 30 passes from the chamber 38 through a conduit 41 to a heat exchange passage or coil 42 extending in heat exchanger 17 toward the warmer end thereof. The coil 42 warms the excess air by indirect heat exchange with incoming air through heat exchange coil 16 to a temperature such that, after work expansion, the expansion product is in a dry saturated state. The warmed excess air is conducted by conduit 43 to the inlet of an expansion turbine 44, the discharge of which is conducted by a conduit 45 to conduit 33 to join with the effluent nitrogen.

The refrigeration of the expanded excess air thus is employed to cool incoming air.

All the scrubber liquid in the scrubber may be produced by liquefaction of a portion or fraction of the air in the heat exchanger coil 16. However, it is found preferable to produce all or a large part of the scrubber liquid by a separate heat exchanger, for example, a heat exchange coil 47 located in the upper portion of the scrubber chamber 19 and having its ends connected by connections 48 and 49 with the conduit 33 on the downstream side of its connection with conduit 45. Control valves 48' and 49' are preferably provided in the connections 48 and 49 and a control valve 50 is preferably interposed in the conduit 33 between the connections 48 and 49.

In operation, after the system has become cooled down to operating conditions, it being understood that all cold parts are adequately protected by insulation, the moisture of the air is removed by deposition on heat exchange material in the regenerators 13. The air is then further cooled to condensation temperature in the heat exchange coil 16 and is thereupon scrubbed by the scrubber liquid 20 to eliminate particles of carbon dioxide and higher-boiling point impurities to a degree at least sufficient to avoid difficulties. The impurity-bearing scrubber liquid is then used for feed to the rectifying column by expanding it to a lower pressure and temperature through expansion valve 25 and then cleaning it to a desired degree as by filtering the solidified materials therefrom by the filter 24, which may be installed in duplicate so that one can be thawed and cleaned while the other is in use.

The cleaned air is conducted by the conduit 36 to the condenser 30 wherein a portion is liquefied and transferred through conduit 39 to the upper part of the rectifying column 27 as a reflux liquid. The excess air or remainder of the cleaned air, actually larger in amount than the air which has been liquefied, and constituting a major portion which is free of impurities although very cold, is diverted and conducted by the conduit 41 to the heat exchange coil 42 for reheating to a temperature, for example, of about −150° C., before it is expanded with the production of external work by the expander 44. The expanded air, now reduced to the condensation temperature corresponding to the lower pressure, joins with the effluent nitrogen. The combined outflowing gas material is warmed to a small extent by passage through the heat exchanger 47 when valves 48' and 49' are opened and valve 50 is closed, which heat exchange liquefies a relatively small fraction of the air in the chamber 19 to provide fresh scrubber liquid.

The refrigeration given up by the reheating of the excess air is usefully employed for cooling incoming air through the coil 16. The power of the expansion turbine 44 should be absorbed in any known manner, for example, it may be usefully applied to assist driving the compressor 10 or a stage of the compression. It should also be noted that in the event that long undisturbed periods of operation are desired, the heat exchange coil 16 and heat exchanger 17 may preferably be installed in duplicate with suitable valved cross-connecting piping arranged so that one heat exchange unit can be taken off stream for thawing while the other is on stream.

Referring now to Fig. 2, wherein similar elements are designated by similar reference characters, the regenerators 113 are preferably designed for cooling a major part of the air to a temperature close to the liquefaction temperature, but not enough to cause any deposition of liquid air on the heat exchange surfaces at the cold ends of the regenerators. The avoidance of such deposition of liquid air is important to prevent adherence of solid carbon dioxide particles with eventual plugging of regenerators. Conduit 15 conducts the cooled air from the regenerators 113 to the lower end of a scrubber chamber 119, and from the overflow cup 122 the conduit 23 conducts used scrubber liquid through the filters 24 for delivery to the upper part of the rectifying column by the conduit 26. The scrubbed air is directed by conduit 36 into the chamber 38, and the remainder that is not liquefied is diverted and conducted from the upper header 37 by conduit 41 to the cold ends of heat exchangers 53 and 53', from the warm end of which the reheated remainder or excess air is led by conduit 43 to the expander 44. The combined expanded air and effluent nitrogen passes through a heat exchange coil 147 in the upper part of the scrubber chamber 119, and from the other end of the heat exchange coil 147 the combined outflowing gas material is conducted by a conduit 134 direct to the cold end of the regenerators 113.

The reheating of the excess air to be expanded is accomplished as follows: connections 54 are tapped off the regenerators 113 at a place where the air temperature is about −100° C., and this tapped-off portion of air is conducted by a conduit 55 to the warm ends of heat exchange coils 56 and 56' disposed within the heat exchangers 53 and 53'. The tapped-off portion of air, which is cooled to about condensation temperature by passage through the coils 56 or 56', is then conducted from the cold ends of the coils by a conduit 57 into the lower part of the scrubber chamber 119. The amount of the tapped-off portion of air is adjusted so that its cooling to condensation temperature heats the excess air to be expanded to a temperature such that after expansion the condition is substantially dry saturated.

A by-pass 60 connecting conduits 45 and 134 may be provided and used mainly for starting the plant, for which purpose valves 45' and 60' are interposed respectively in conduits 45 and 60. For starting, valve 45' is closed and valve 60' is opened, while the compressor and expander are operated until the regenerators are cooled to operating temperature, then valve 60' is closed and valve 45' opened to start the production of scrubber liquid which may be filtered and transferred to the column 27 for cooling it to operating temperatures. If desired during normal operation, adjustments of valves 45' and 60' may be made to by-pass some of the expanded air around the liquefier coil 147.

In the operation of regenerators, a certain small amount of the air compressed by the compressor 10 is lost due to the necessity of blowing down the regenerator containing air at 75 p. s. i. to substantially atmospheric pressure before the outgoing cold low pressure effluents can be admitted. When the oxygen product is withdrawn as liquid oxygen of 99.5% oxygen content, about one-quarter of the remaining air, which is cleaned and cooled, is tapped off at 54 through conduit 55 at a temperature of about −100° C. and about three-quarters is cooled to about −170° C. and conducted by conduit 15 to the scrubber 119. The fraction of the purified air, still at condensation pressure, condensed by the heat exchange coil 147, may be about one-twenty-second more or less and the fraction condensed by the condenser 37 is about one-eighth of the scrubbed air. Thus over one-seventh of the air enters the rectifying column 27 by the feed lines 26 and 39. A small portion of this feed flashes into vapor upon expansion through valves 25 and 40 to the column pressure of about 5 p. s. i. and the balance is rectified upon descent through the column 27 toward the chamber 29 being enriched to a final purity of about 99.5% oxygen content. The boiling of oxygen in the chamber 29 produces vapor that, as it ascends the column, becomes richer in nitrogen and together with the flash-off vapor forms an effluent at 33 amounting to about one-eighth of the cleaned air at a temperature of about −190° C. Liquid oxygen withdrawn at 32 amounts to about one-sixth of the feed to the column 27 or about one-thirty-sixth of the cleaned air.

The excess air or remainder of the cleaned air leaving through conduit 41 amounts to about three-fifths of the cleaned air which is reheated by heat exchangers 53 to a temperature of about −150° C. Upon expansion of the reheated air through turbine 44 to a pressure slightly below 5 p. s. i., the temperature is reduced to nearly —190° C. The heat exchange coil 147 warms the combined nitrogen effluent and the expanded excess air to temperature slightly below that of the air leaving the regenerators through conduit 15. The material flowing outward through the regenerators amounts to 97% of the inflowing air by weight but the outflowing volume is substantially greater than the inflowing volume due to the pressure difference so that the moisture and carbon dioxide are effectively re-evaporated from the regenerator heat storage surfaces.

While two embodiments of exemplary apparatus have been described in order to disclose the principles of the present invention, it will be understood that modifications may be made without departing from the essentials of the invention; for example, although it is preferred to effect liquefaction of air in two steps in the order illustrated, it is contemplated that the two steps of liquefaction could be combined or could be effected in the reverse order. Also it is contemplated that if desired the excess air to be expanded may be by-passed around the condenser 37 and the condenser 37 be made smaller to receiver only the air to be totally condensed therein. The liquid produced by the condenser 37 could then be passed to the scrubber to join the scrubber liquid and the liquids from both liquefactions would be passed through the filters.

What is claimed is:

1. A process for separating a gas mixture comprising lower- and higher-boiling-point components and containing impurities having higher condensing temperatures which process comprises providing a stream of the mixture at a condensation pressure below about 100 p. s. i., freed of moisture, and cooled to a low temperature; scrubbing such stream with a scrubber liquid to remove impurities therefrom, such impurities being then contained in the scrubber liquid; subjecting such cleaned stream to partial liquefaction to produce scrubber liquid; subjecting the balance of said stream to another partial liquefaction to provide a second liquid fraction and an unliquefied remainder; eliminating impurities from the scrubber liquid; rectifying the resulting liquefied material to separate lower- and higher-boiling products; warming the unliquefied remainder substantially sufficiently to avoid formation of liquid upon subsequent expansion; expanding with production of external work such warmed remainder of the mixture to a low pressure; and using part of the refrigeration of said work-expanded portion and the lower-boiling product of rectification for producing scrubber liquid and the balance of the refrigeration for cooling gas mixture.

2. A process for separating a gas mixture according to claim 1 in which the warming of the unliquefied remainder is effected by heat exchange with incoming gas mixture.

3. A process for separating a gas mixture comprising lower- and higher-boiling-point components and containing impurities having higher condensing temperatures which process comprises providing such mixture at a condensation pressure below 100 p. s. i.; effecting heat exchange between the mixture and a heat storage mass to deposit moisture and cool the mixture to a low temperature; scrubbing such stream with a scrubber liquid to remove impurities therefrom, such impurities being contained in the scrubber liquid; subjecting such cleaned stream to partial liquefaction to produce scrubber liquid; eliminating impurities from the scrubber liquid; subjecting the balance of said stream to another partial liquefaction to provide a second liquid fraction and an unliquefied remainder; rectifying the resulting liquefied material to separate lower- and higher-boiling products; warming the unliquefied remainder substantially sufficiently to avoid formation of liquid upon subsequent expansion; expanding with production of external work such warmed remainder of the mixture to a low pressure; and using part of the refrigeration of said work-expanded portion and the lower-boiling product of rectification for producing scrubber liquid and the balance of the refrigeration for cooling gas mixture.

4. A process for separating a gas mixture comprising lower- and higher-boiling-point components and containing impurities having higher condensing temperatures which process comprises providing such mixture at a condensation pressure below 100 p. s. i.; effecting heat exchange between the mixture and a heat storage mass to deposit moisture and cool the mixture to a low temperature; scrubbing such stream with a scrubber liquid to remove impurities therefrom, such impurities being contained in the scrubber liquid; subjecting such cleaned stream to partial liquefaction to produce scrubber liquid; filtering and passing used scrubber liquid to a zone of rectification, said rectification producing higher- and lower-boiling products; subjecting the balance of said stream to another partial liquefaction to provide a second liquid fraction and an unliquefied remainder; expanding and passing said second liquid fraction to said zone of rectification; warming the unliquefied remainder substantially sufficiently to avoid formation of liquid upon subsequent expansion by indirect heat exchange with incoming gas mixture; expanding with production of external work such warmed remainder of the mixture to a low pressure; mixing such work-expanded portion with effluent lower-boiling product of rectification; and effecting heat exchanges for using part of the refrigeration of the mixed expanded portion and effluent to produce said scrubber liquid and the balance of refrigeration to cool incoming gas mixture.

5. A process for separating a gas mixture comprising lower- and higher-boiling-point components and containing impurities having higher condensing temperatures which process comprises providing such mixture at a condensation pressure below 100 p. s. i.; effecting heat exchange between the mixture and a heat storage mass to deposit moisture and cool the mixture to a low temperature; withdrawing from the heat storage mass about one-fourth of the mixture at about —100° C.; continuing the cooling of the balance to about condensation temperature; cooling the withdrawn portion by heat exchange with an excess vapor fraction to superheat the latter; scrubbing both such balance and the one-fourth portion of the mixture with a scrubber liquid to remove impurities therefrom, such impurities being contained in the scrubber liquid; subjecting such cleaned stream to partial liquefaction to produce scrubber liquid; eliminating impurities from the scrubber liquid; subjecting the balance of said stream to another partial liquefaction to provide a second liquid fraction; expanding and passing both the cleaned scrubber liquid and said liquid fraction to a zone of rectification for production of liquid higher-boiling product and gaseous lower-boiling product; warming the excess vapor fraction remaining after said second liquefaction by said heat exchange with the withdrawn portion of mixture; expanding with production of external work the warmed excess vapor; combining the expanded excess vapor with the effluent lower-boiling product; warming the excess vapor and product combination by effecting therewith said heat exchange producing scrubber liquid; and then cooling the heat storage mass with the effluent excess vapor and product combination.

6. In apparatus for separating a gas mixture by low temperature rectification including a rectifying column, means for supplying the mixture at about its condensation pressure, and means for cooling such mixture by heat exchange with outflowing lower-pressure gaseous material, the combination therewith of means for scrubbing such cooled mixture with a liquid fraction thereof to remove therefrom higher-boiling point impurities; means for eliminating impurities from said liquid fraction means for liquefying a portion of said cleaned mixture to produce said liquid fraction; means for liquefying a second portion of said cleaned mixture by heat exchange with a higher-boiling separation product to form a second liquid fraction; means for passing the first-mentioned impurity-freed liquid fraction and said second liquid fraction to the rectifying column for rectification therein; means for warming a remainder of such cleaned mixture substantially sufficiently to avoid formation of liquid during subsequent expansion with external work; a work-producing expander connected to expand such warmed remainder; and conduit means for applying at least part of the refrigeration of the expanded remainder for cooling said first-mentioned means for liquefying a portion of the cleaned mixture to produce said first-mentioned liquid fraction, the balance of the refrigeration being used for cooling incoming gas mixture.

References Cited in the file of this patent

UNITED STATES PATENTS

| | | |
|---|---|---|
| 1,626,345 | Le Rouge | Apr. 26, 1927 |
| 2,040,107 | Schlitt | May 12, 1936 |
| 2,040,116 | Wilkinson et al. | May 12, 1936 |
| 2,048,076 | Linde | July 21, 1936 |
| 2,209,748 | Schlitt | July 30, 1940 |
| 2,256,421 | Borchardt | Sept. 16, 1941 |
| 2,413,752 | Dennis | Jan. 7, 1947 |
| 2,503,939 | De Baufre | Apr. 11, 1950 |
| 2,504,051 | Scheibel | Apr. 11, 1950 |
| 2,513,306 | Garbo | July 4, 1950 |
| 2,518,652 | Yendall et al. | Aug. 15, 1950 |
| 2,537,044 | Garbo | Jan. 9, 1951 |
| 2,626,510 | Schilling | Jan. 27, 1953 |

OTHER REFERENCES

Chemical Engineering, March 1947, pages 126 through 134, Air Separation Principles and Technology.